July 21, 1953           LAN JEN CHU           2,646,506
ELECTROMAGNETIC WAVEGUIDE RADIATOR
Filed July 9, 1945
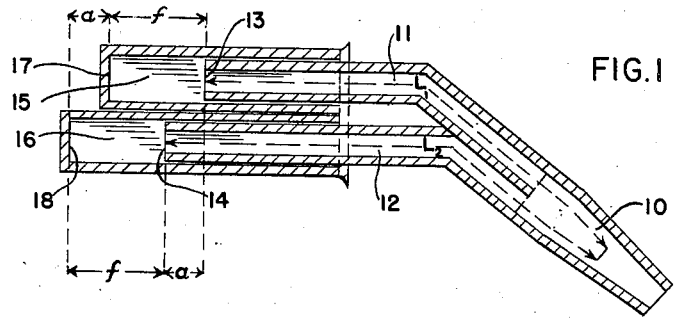
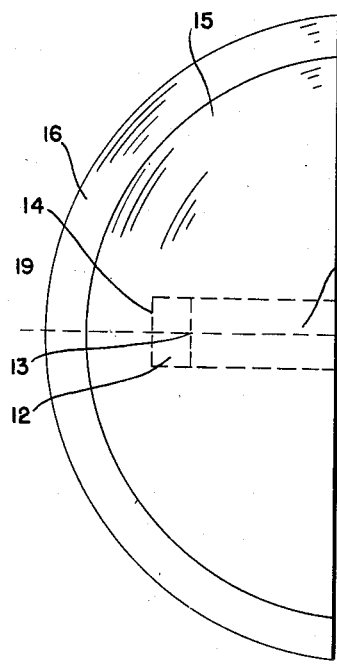
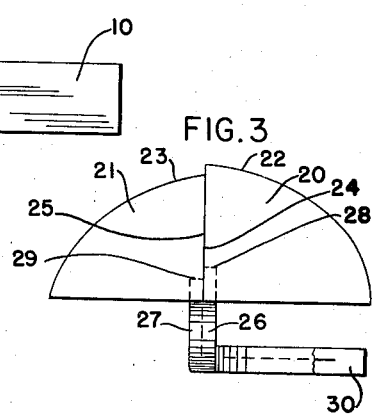
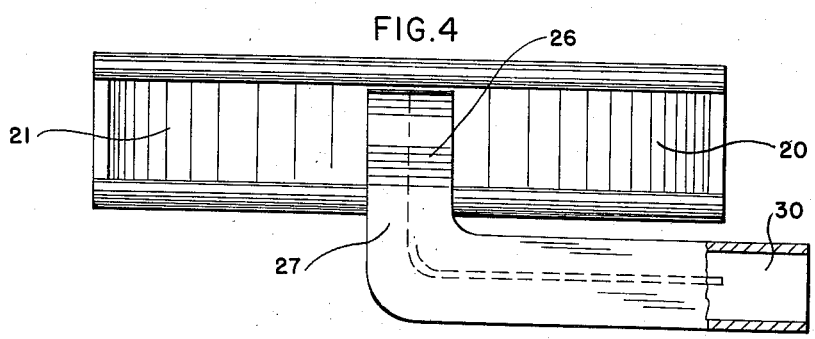
INVENTOR
LAN JEN CHU
BY William D. Hall,
ATTORNEY Patented July 21, 1953

2,646,506

UNITED STATES PATENT OFFICE 2,646,506

ELECTROMAGNETIC WAVEGUIDE RADIATOR

Lan Jen Chu, Brookline, Mass., assignor, by mesne assignments, to the United States of America as represented by the Secretary of War Application July 9, 1945, Serial No. 604,024

6 Claims. (Cl. 250—33.65)

This invention relates to transmission apparatus and more particularly to wave guides.

It is one object of this invention to provide means for supplying electromagnetic power to wave guides in such way as to minimize reflections from the load back to the source of power.

It is another object of the invention to feed power to "pill-box" wave guides and obtain in-phase outputs from the "pillbox" wave guides in such a manner that reflections to the sources are minimized.

Further objects and advantages will appear more fully from the disclosure herein.

In the drawings:

Fig. 1 is a vertical section of a preferred embodiment of the invention;

Fig. 2 is a plan view of the same device;

Fig. 3 is a plan view of another preferred embodiment; and

Fig. 4 is an elevation view of the device shown in Fig. 3.

Referring now to Fig. 1, electromagnetic energy is assumed to be transmitted from a power source (not shown) through a wave guide 10 from which it is introduced into wave guides 11 and 12. It is contemplated that the energy divide in approximately equal amounts between the latter wave guides. From wave guides 11 and 12 the energy is fed to focal lines 13 and 14, respectively, of pillboxes 15 and 16 having parabolic reflecting surfaces 17 and 18, the configurations of which are apparent in Fig. 2. The pillboxes may be so arranged that they have a broad wall in common or adjoining broad walls as shown in Fig. 1. A pillbox type wave guide comprises a cylindrical reflecting surface of small axial dimension mounted between a pair of plane parallel metallic walls or plates which serve to enclose the ends of the cylinder. The separation of the walls, and hence the height of the cylinder, is preferably less than a half wave length in free space at the operating frequency. The plane of symmetry, or the plane of the principal axes, as herein used refers to the plane passing through the focal line and the apex of the parabolic cylinder. The electric field vectors of the energy emitted respectively from wave guides 11 and 12 are oriented perpendicularly to the broad walls of pillboxes 15 and 16. A distance $a$ separates the parabolic reflecting surfaces 17 and 18 as well as the focal lines 13 and 14 of reflecting surfaces 17 and 18 along their common plane of symmetry 19, whereas the apertures of the pillboxes 15 and 16 terminate along the same plane. The amount of separation $a$ may be arbitrarily chosen, and the difference between the distance $L_1$ from focal line 13 to a point in wave guide 10 and distance $L_2$ from the focal line 14 in wave guide 12 to a common line perpendicular to the axis of wave guide 10 may be changed by various means, one of which is to alter the angle of the bends shown in wave guides 11 and 12.

Assuming that the wavelengths in guides 11 and 12 are the same and designated by $\lambda_g$ and that the wavelength in guides 15 and 16 is designated by $\lambda_0$, it is possible to insure a proper phase front at the aperture by satisfying the following relation:

(1) $$\frac{L_1}{\lambda_g}+\frac{2f}{\lambda_0}=\frac{L_2}{\lambda_g}+\frac{2f}{\lambda_0}+\frac{a}{\lambda_0}$$

then (2) $$\frac{L_1-L_2}{\lambda_g}=\frac{a}{\lambda_0}$$

Thus, no matter what the displacement $a$ is to be, if the bend of the feed is so adjusted that the difference between $L_1$ and $L_2$ is equal to it in terms of the respective wavelengths, the phase front will be the usually desired in-phase phase front. Furthermore, the effect will not be disturbed by comparatively wide changes of frequency.

There still remains to be considered the problem of reflections back into the feed and inherent mismatch at that point. Mismatch is reduced by setting up a phase difference of a half wavelength of the reflected energy at the power-divider to bring about cancellation. Therefore, the following relationship is evolved:

(3) $$2\left(\frac{L_1}{\lambda_g}+\frac{f}{\lambda_0}\right)-2\left(\frac{L_2}{\lambda_g}+\frac{f}{\lambda_0}\right)=\frac{1}{2}$$

(4) $$L_1-L_2=\frac{\lambda_g}{4}$$

and (5) $$a=\frac{\lambda_0}{4}$$

Since the two said wave guides 11 and 12 have the same wavelength and their lengths differ by one-quarter wavelength, mismatch will be substantially reduced by cancellation.

For horizontal polarization, with the E-vector parallel to the broad side of the "pillbox," the structure may be as shown in Fig. 3 in plan view and Fig. 4 in elevation view. Pillboxes 20 and 21 have semi-parabolic reflecting surfaces 22 and 23, respectively. The pillboxes have a sidewall or member affording conductive surfaces 24 and 25 along the plane of symmetry. The term plane of symmetry as used in connection with the semi-parabolic surface is used to denote that plane passing through the focal line and the apex of the parabolic surface that would form the plane of symmetry of the entire parabolic surface, if present. The plane of symmetry is also the plane of the principal axes, which extend from the foci to the vertex of the parabolic surface. Surfaces 24 and 25 may be on opposite faces of the same member, or they may be faces of different members in close juxtaposition, it being preferred that the surfaces 24 and 25 are separated by only a small distance. Pillboxes 20 and 21 are fed by wave guides 26 and 27, respectively, having apertures 28 and 29 terminating near the focal line of reflecting surfaces 22 and 23. Wave guides 26 and 27 are adapted to receive energy in approximately equal amounts from wave guide 30 which is supplied by a source of electromagnetic energy (not shown). $L_1'$ and $L_2'$ are the distances from the apertures 28 and 29, respectively, along the axes of wave guides 26 and 27 to a common line perpendicular to the axis of wave guide 30. Parabolic surfaces 22 and 23 may have the same focal length, and are arranged so that one surface is displaced from the other a distance $a'$ along the substantially common plane of symmetry. If the wavelengths in wave guides 20 and 21 are assumed the same and denoted by $\lambda_0'$, and the wavelength in wave guides 26 and 27 is assumed the same and denoted by $\lambda_g'$, the Equations 4 and 5 will hold for the structures for Figs. 3 and 4 merely by replacing the letters involved with the same letters primed.

The radiation patterns emanating from the apertures of a wave guide device built according to this invention are substantially identical with those obtained by the ordinary "pillbox" methods, with the additional advantage of reduced reflection back to the power source. The device has broad band characteristics, so that a comparatively broad frequency range will give substantially the same results in matching the power source.

It will be apparent to those skilled in the art that the principles of this invention are susceptible of a multitude of applications. For instance, coaxial transmission lines instead of wave guide transmission lines could be utilized to transfer power from the source to the pillboxes. It is not necessary that the pillboxes radiate into space, nor that pillboxes be used, as other wave guides could be utilized and the principle of the invention preserved.

Further, it will be apparent to those skilled in the art that many variations and modifications of the invention are possible without departing from its scope and spirit. Therefore, it is not desired to restrict the claims to the precise embodiments as disclosed herein.

What is claimed is:

1. In an apparatus for transmitting electromagnetic energy, the combination including two reflectors in the form of parabolic flat cylinders having parabolic reflecting surfaces of the same focal length and with their principal axes lying in a common plane and adjoining broad sides, one of said reflectors having its parabolic surface displaced a distance $a$ along said plane toward the focal lines of said parabolic reflecting surfaces so that said focal lines are displaced a distance $a$ from each other along the common plane of said reflecting surfaces, and two transmission lines adapted to receive electromagnetic energy from a common source, and transmit said energy into said reflectors near said focal lines in a direction generally toward said parabolic reflecting surfaces, the longer of said transmission lines being adapted to feed the said one reflector, the shorter of said transmission lines being adapted to feed the said other reflector, said combination being so constructed that substantially the following relationship exists:

$$a = \frac{\lambda_0}{4}$$

and $$D = \frac{\lambda_g}{4}$$

wherein D is the difference in the lengths of said transmission lines, $\lambda_g$ is the wavelength of energy in said transmission lines, $a$ is the said distance of separation between said focal lines and $\lambda_0$ is the wavelength of energy in said reflectors.

2. In an apparatus for transmitting electromagnetic energy, two cylindrical reflectors having end walls and semi-parabolic reflecting surfaces of the same focal length and having boundary surfaces disposed along a plane including the principal axes of said parabolic reflecting surfaces, said surfaces along said plane lying in close juxtaposition, one of said reflectors having its parabolic surface displaced a distance $a$ in the direction of the principal axes of said parabolic reflecting surfaces so that the focal lines of said parabolic reflecting surfaces are separated a distance $a$ along said plane, and two wave guides adapted to receive electromagnetic energy from a common source and transmit said energy into said reflectors near said focal lines in a direction toward said parabolic reflecting surfaces, the longer of said wave guides being adapted to feed said one reflector, the shorter of said wave guides being adapted to feed said other reflector, said combination being so adapted that substantially the following relationship exists:

$$a = \frac{\lambda_0}{4}$$

and $$D = \frac{\lambda_g}{4}$$

wherein D is the difference in the lengths of said wave guides, $\lambda_g$ is the wavelength of energy in said wave guides, $a$ is the said distance of separation between said focal lines and $\lambda_0$ is the wavelength of energy in said reflectors.

3. In an apparatus adapted to transmit electromagnetic energy, the combination including two reflectors, each having a reflecting surface including a portion of a parabolic cylinder, said surfaces having substantially the same focal length and having their principal axes substantially in a common plane, one of said reflectors having its reflecting surface displaced from the focal line of the said reflecting surface of the said other reflector so that the two focal lines of said reflecting surfaces are separated a distance $a$ along said plane, and two transmission lines of unequal length adapted to transmit electromagnetic energy from a common source to points near the focal line of each of said reflectors in a direction generally toward said reflecting surfaces, the longer of said transmission lines feeding the said one reflector and the shorter of said transmission lines feeding the said other reflector, the combination being so adapted that substantially the following relationship exists:

$$a = \frac{n\lambda_0}{4}$$

and $$D = \frac{\lambda_g}{4}$$

wherein $n$ is any odd integer, $D$ is the difference in the lengths of said transmission lines, $\lambda_g$ is the wavelength of energy in said transmission lines, $a$ is the said distance of separation between said focal lines and $\lambda_0$ is the wavelength of energy in said reflectors.

4. In an apparatus for transmitting electromagnetic energy, the combination including two antennas in close juxtaposition terminating in a common plane of radiation and having given focal lines and principal axes, said two antennas including means to individually radiate substantially identical beams of electromagnetic energy in substantially the same phase and the same directions in space, and two transmission lines, each of which transmits electromagnetic energy from a common source to a point near the feed points of each antenna in a direction generally toward said antennas, the electrical distances from said source to said two antennas and back to said source through said transmission lines differing by a half wavelength of said energy so that reflections from said two antennas arrive at said common source in phase opposition, said two antennas being displaced from one another by an amount such that their focal lines are displaced from one another in the direction of the principal axes of said antennas by a distance substantially equal to a quarter wavelength of said energy, whereby energy from said two transmission lines upon being radiated by said two antennas arrives at said plane of radiation in phase.

5. In an apparatus for transmitting electromagnetic energy, the combination including two antennas in close juxtaposition terminating in a common plane of radiation, said two antennas comprising reflectors in the form of a pair of parabolic cylinders having parallel focal lines and parallel principal axes and having radiating apertures lying in the same plane, said two antennas including means to individually radiate substantially identical beams of electromagnetic energy in substantially the same phase and the same direction in space, and two transmission lines, each of which transmits electromagnetic energy from a common source to a point near the feed points of each antenna in a direction generally toward said antennas, the electrical distances from said source to said two antennas and back to said source through said transmission lines differing by a half wavelength of said energy so that reflections from said two antennas arrive at said common source in phase opposition.

6. The apparatus defined in claim 5 wherein said focal lines are displaced from each other in the direction of said principal axes a distance substantially equal to a quarter wavelength of said energy.

LAN JEN CHU.

References Cited in the file of this patent

UNITED STATES PATENTS

| Number | Name | Date |
| --- | --- | --- |
| 2,129,712 | Southworth | Sept. 13, 1938 |
| 2,283,935 | King | May 26, 1942 |
| 2,297,896 | Katzin | Oct. 6, 1942 |
| 2,455,403 | Brown | Dec. 7, 1948 |

FOREIGN PATENTS

| Number | Country | Date |
| --- | --- | --- |
| 871,633 | France | Jan. 19, 1942 |